United States Patent
Wong et al.

(10) Patent No.: US 10,133,934 B2
(45) Date of Patent: Nov. 20, 2018

(54) SYSTEMS AND METHODS FOR POST PROCESSING TIME-LAPSE VIDEOS

(71) Applicant: Apple Inc., Cupertino, CA (US)

(72) Inventors: Earl Q. Wong, Vallejo, CA (US); Garrett Johnson, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/273,644

(22) Filed: Sep. 22, 2016

(65) Prior Publication Data

US 2017/0091557 A1 Mar. 30, 2017

Related U.S. Application Data

(60) Provisional application No. 62/235,522, filed on Sep. 30, 2015.

(51) Int. Cl.
*G06K 9/00* (2006.01)
*H04N 19/70* (2014.01)

(52) U.S. Cl.
CPC .......... *G06K 9/00744* (2013.01); *G06K 9/00* (2013.01); *H04N 19/70* (2014.11)

(58) Field of Classification Search
CPC ................ H04N 1/2133; H04N 1/215; H04N 2201/0084; H04N 5/23203; H04N 5/772; H04N 9/8042; H04N 1/00236; H04N 1/00241; H04N 1/2158; H04N 1/32101; H04N 2101/00; H04N 2201/3225; H04N 2201/3247; H04N 19/107; H04N 19/114; H04N 19/115; H04N 19/132; H04N 19/137; H04N 19/14; H04N 19/142; H04N 19/147; H04N 19/149; H04N 19/154; H04N 19/159; H04N 19/172; H04N 19/18; H04N 19/187; H04N 21/23418; H04N 21/2353; H04N 21/2407; H04N 21/25; H04N 21/251; H04N 21/4826; H04N 21/4828; H04N 21/8352; H04N 21/8405; H04N 21/8456;
(Continued)

(56) References Cited

U.S. PATENT DOCUMENTS 5,828,848 A * 10/1998 MacCormack ... G06F 17/30017
709/247
5,943,093 A 8/1999 Anderson
(Continued)

*Primary Examiner* — Aklilu Woldemariam
(74) *Attorney, Agent, or Firm* — Blank Rome LLP

(57) ABSTRACT

Techniques and devices for post-processing time-lapse videos are described. The techniques include obtaining an input time-lapse sequence of frames and determining a visual metric value, e.g., average luminance, for each frame. A curve of best fit may then be determined for the visual metric values of the frames. The visual metric values, e.g., the average luminance values, of the plurality of frames may then be adjusted, e.g., by adjusting the visual metric values of each frame to be equal to the corresponding value determined by the curve of best fit. Some embodiments include further adjusting the visual metric values to be equal to a weighted average of the adjusted visual metric values for adjacent frames in the time-lapse sequence. Finally, a visual characteristic of the frames, e.g., an image histogram, may be adjusted based on the frame's determined adjusted visual metric value, and an output time-lapse sequence may be generated.

24 Claims, 5 Drawing Sheets

(58) Field of Classification Search
CPC .... H04N 19/01; H04N 5/2351; H04N 5/2256; H04N 5/2354; H04N 5/2356; H04N 1/00307; H04N 2201/3274; H04N 2201/3278; H04N 9/04; H04N 5/23212; H04N 5/2353; H04N 19/70; G06K 9/00751; G06K 9/00758; G06K 9/00275; G06K 9/00281; G06K 9/6215; G06K 9/629; G06K 9/00744; G06F 17/30247; G06F 17/3028; G06F 17/30799; G06F 17/30843; G06F 17/10; G06F 17/3002; G06T 2207/20004; G06T 5/009; G06T 5/40; G06T 2207/30168; G06T 7/0002; G06T 15/08; G06T 2207/10016; G06T 2207/20084; G06T 2207/30004; G06T 7/0012; G06T 7/20; G06T 9/002; A61B 18/1233; A61B 18/14; A61B 18/1492; A61B 18/24
USPC ....... 382/103, 154, 168, 181, 184, 201, 232, 382/236, 243; 348/220, 231, 232, 233, 348/221, 362
See application file for complete search history.

(56) References Cited

U.S. PATENT DOCUMENTS

| | | | |
|---|---|---|---|
| 6,904,184 B1 | 6/2005 | Taylor | |
| 8,743,291 B2* | 6/2014 | Li | G06T 5/009 |
| | | | 345/603 |
| 8,873,877 B2* | 10/2014 | Su | G06T 9/00 |
| | | | 382/239 |
| 8,879,857 B2* | 11/2014 | Raveendran | H04N 5/144 |
| | | | 348/384.1 |
| 2007/0257988 A1* | 11/2007 | Ong | H04N 17/004 |
| | | | 348/182 |
| 2008/0012856 A1* | 1/2008 | Yu | G06T 7/0012 |
| | | | 345/424 |
| 2008/0219498 A1* | 9/2008 | Johnson | G06T 7/0004 |
| | | | 382/100 |
| 2010/0008643 A1* | 1/2010 | Rakib | G06F 17/30799 |
| | | | 386/341 |
| 2010/0104184 A1* | 4/2010 | Bronstein | G06F 17/30784 |
| | | | 382/170 |
| 2010/0172567 A1* | 7/2010 | Prokoski | A61B 5/0064 |
| | | | 382/132 |
| 2013/0124507 A1* | 5/2013 | Gartland | G06F 17/30011 |
| | | | 707/723 |
| 2013/0182002 A1* | 7/2013 | Macciola | H04N 1/387 |
| | | | 345/589 |
| 2013/0343598 A1* | 12/2013 | Kocks | H04N 21/8405 |
| | | | 382/100 |
| 2014/0099034 A1* | 4/2014 | Rafati | G06K 9/00751 |
| | | | 382/209 |
| 2014/0229310 A1* | 8/2014 | Gudorf | G06Q 30/0601 |
| | | | 705/26.1 |
| 2014/0300769 A1 | 10/2014 | Hartford | |
| 2015/0043893 A1 | 2/2015 | Nishizaka | |
| 2015/0169982 A1* | 6/2015 | Perry | G06K 9/4671 |
| | | | 382/195 |
| 2015/0229819 A1* | 8/2015 | Rivard | H04N 5/2354 |
| | | | 348/362 |
| 2015/0341646 A1* | 11/2015 | Sze | H04N 19/166 |
| | | | 375/240.26 |
| 2016/0005153 A1* | 1/2016 | Atkins | G06T 5/007 |
| | | | 345/591 |

* cited by examiner

SYSTEMS AND METHODS FOR POST PROCESSING TIME-LAPSE VIDEOS

BACKGROUND

This disclosure relates generally to the field of video capture, and more particularly, to processing time-lapse videos, e.g., after they are acquired.

The advent of portable integrated computing devices has caused a wide proliferation of cameras and video devices. These integrated computing devices commonly take the form of smartphones or tablets and typically include general purpose computers, cameras, sophisticated user interfaces including touch sensitive screens, and wireless communications abilities through WiFi, Long Term Evolution (LTE), High Speed Downlink Packet Access (HSDPA) and other cell-based or wireless technologies (WiFi is a trademark of the Wi-Fi Alliance, LTE is a trademark of the European Telecommunications Standards Institute (ETSI)). The wide proliferation of these integrated devices provides opportunities to use the devices' capabilities to perform tasks that would otherwise require dedicated hardware and software. For example, as noted above, integrated devices such as smartphones and tablets typically have one or two embedded cameras. These cameras generally amount to lens/camera hardware modules that may be controlled through the general purpose computer using firmware and/or software (e.g., "Apps") and a user interface, e.g., including a touch-screen interface and/or touchless control, such as voice control.

The integration of cameras into communication devices such as smartphones and tablets has enabled people to share images and videos in ways never before possible. It is now very popular to acquire and immediately share photos with other people by either sending the photos via text message, by SMS, by email, or by uploading the photos to an Internet-based website, such as a social networking site or a photo sharing site.

Immediately sharing video is likewise possible, as described above for sharing of photos. However, bandwidth limitations and upload times significantly constrain the length of video that can easily be shared. In many instances, a short video clip that captures the essence of the entire action recorded may be desirable. The duration of the video clip may depend on the subject matter of the video clip. For example, a several-hour car ride or an evening at a party might be reduced to a time-lapse video clip lasting only a minute or two. Other actions, such as a sunset or the movement of clouds, might be better expressed in a clip of twenty to forty seconds. While a time-lapse video that can be shared may be desired, a user often may wish to improve the quality of the time-lapse video clip that is created and/or shared. In particular, users may wish to reduce the amount of potentially jarring exposure changes experienced from image to image in the resultant assembled time-lapse video.

SUMMARY

Disclosed herein are adaptive image processing techniques, whereby time-lapse video acquired over any given length of time may be automatically processed to provide time-lapse videos with improved image quality, e.g., improved exposure levels and transitions in exposure across the various images that make up the resultant assembled time-lapse video. In time-lapse videos, images may be captured at a frame rate (usually expressed in frames per second, or, "fps") that is lower than the frame rate at which they are played back. Playing the captured frames back at a higher rate than they were captured, results in a time-lapse effect that is familiar to most people. For example, images of a blooming flower may be captured over a period of a few days (or weeks) at a frame rate of one frame per hour. The flower will appear to bloom in a matter of seconds when the images are played back at a rate of 30 fps. Likewise, a sunset may be recorded at a frame rate of a few frames per minute and played back at normal frame rate to provide a 20-40-second long clip of the entire sunset.

As images are acquired over extended periods of time, conditions such as ambient light or the overall scene brightness levels in the captured images may change. For instance, in the flower example, the ambient light may change over time as the day passes and turns to night. Likewise, some days may be brighter than others. Many cameras include an auto-exposure (AE) feature that automatically sets exposure parameters such as shutter speed, exposure time, aperture setting, image sensor sensitivity, white balance, tone mapping, and the like, based on the current lighting conditions being captured by the camera. The camera's AE feature may then adjust the exposure parameters of the camera, e.g., during the filming of video images, to account for changes in ambient light conditions. When filming at normal frame rates, for example, 30 fps, ambient conditions typically do not change a great amount between subsequent images because the duration between subsequent images is so small. Thus, only small incremental adjustments to the exposure parameters are usually required between subsequent images.

When recording time-lapse video, however, the images used in the resultant time-lapse video clip are acquired less frequently and, ambient conditions may change a great deal between the capture of subsequent images use in the time-lapse video clip. Consequently, the camera's AE function may make greater changes to its exposure parameters between the capture of subsequent images. When sequential images having significantly different exposure parameters are played back at a high frame rate (as in a time-lapse video), a strobe-like artifact, referred to as "flicker," may be introduced into the played back video.

The methods and devices described herein may be used to reduce or prevent the undesired flicker effect in time-lapse video. According to some embodiments described herein, the techniques may involve: obtaining images having RGB data for pixels in each frame; calculating corresponding $YC_BC_R$ values for each pixel in each frame; determining average luminance ("Y") values for each frame; curve-fitting the average Y values over a predetermined number of consecutive frames used in the time-lapse video; and then adjusting the Y values of the pixels of each frame (e.g., by scaling/shifting/spreading/clamping, etc. the image's luminance histogram) based on the determined curve-fitting.

In some embodiments, the curve-fit average Y values over a given number of frames may be further smoothed by using a weighted average of the curve-fit Y values of a predetermined number of adjacent frames in the time-lapse video. In some embodiments, the curve-fitting process may comprise using a second-order or third-order polynomial curve that attempts to minimize the differences between the average Y values of the frames in the time-lapse video and the curve. In some embodiments, the image data with the adjusted Y values may then be converted back into an RGB format and encoded with the other Y value-adjusted frames from the sequence of captured images to form a time-lapse video having improved quality.

DETAILED DESCRIPTION

Figure 1:
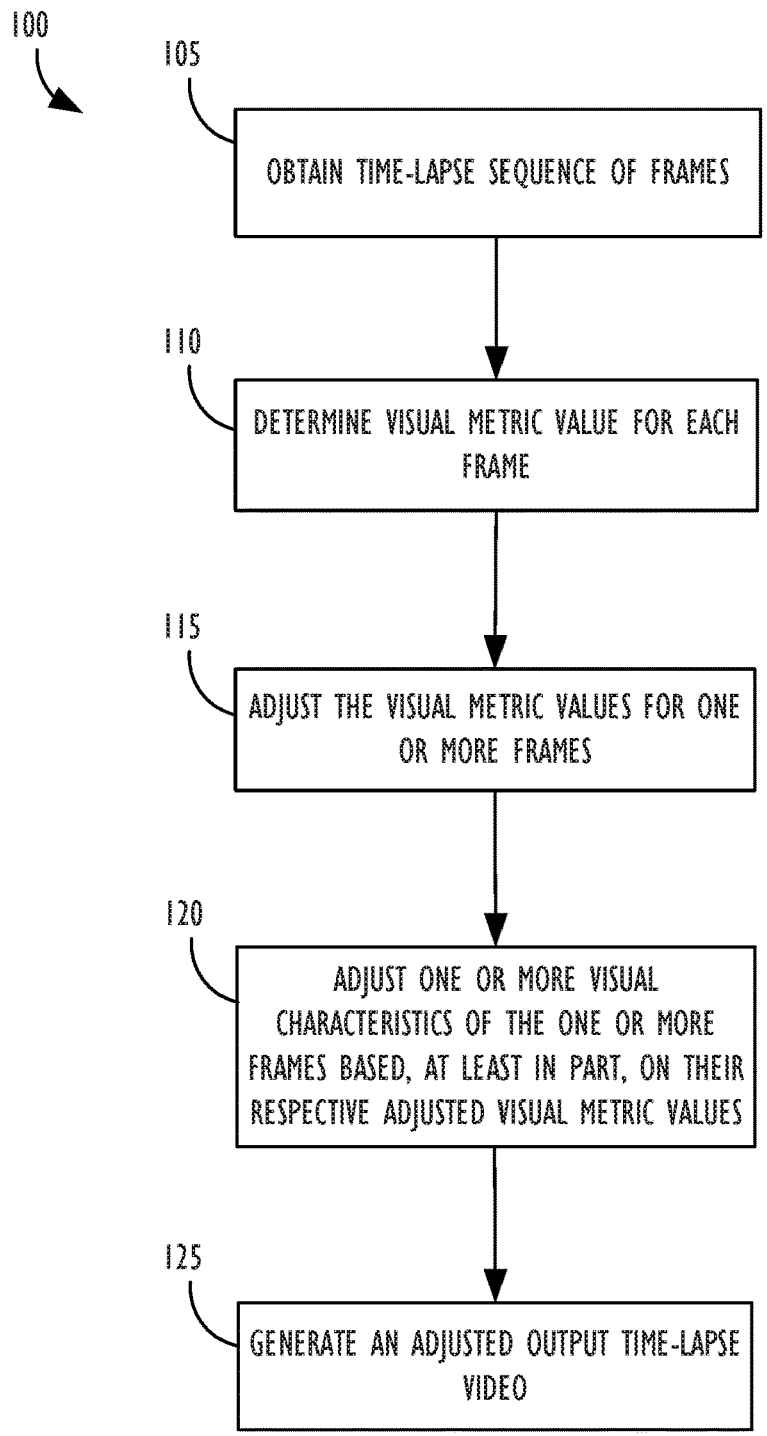
FIG. 1 is a flowchart illustrating an embodiment of the adaptive image processing techniques described herein.

Systems, methods, and program storage devices (e.g., having instructions stored thereon) are disclosed for assembling improved time-lapse videos. In particular, the techniques disclosed herein may improve the exposure levels and, in particular, transitions in exposure levels, across the various images that make up the resultant assembled time-lapse video. The techniques disclosed herein are applicable to any number of electronic devices with displays such as digital cameras, digital video cameras, mobile phones, personal data assistants (PDAs), portable entertainment players, and, of course, desktop, laptop, and tablet computer systems.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one implementation of the invention, and multiple references to "one embodiment" or "an embodiment" should not be understood as necessarily all referring to the same embodiment.

Time-lapse video may be achieved by playing a series of images back at a faster frame rate (referred to herein as the "playback frame rate") than the rate at which those images were acquired (referred to herein as the "acquisition frame rate"). For the discussion that follows, the playback frame rate may be 30 fps, though playback can be at any rate, for example 20 fps, 45 fps, or 60 fps. As an example, source video captured for 40 seconds at an acquisition frame rate of 15 fps yields 600 images. Playing those 600 images back at a playback frame rate of 30 fps yields 20 seconds of time-lapse video. To create a 20-second time-lapse video of events spanning a longer duration, an even slower acquisition frame rate may be used. For example, 80 seconds of source video captured at an acquisition frame rate of 7.5 fps to yield 600 images could be played back at 30 fps to provide 20 seconds of time-lapse video. Producing 20 seconds of time-lapse video from source video acquired for 48 hours would require an acquisition of one frame about every five minutes (again, assuming a 30 fps playback rate).

A problem may arise when the changes in exposure level over the duration of the captured frames are suboptimal for playback as a time-lapse video. For example, if a user is filming a sunset, a large insect may fly in front of the lens and obscure the captured image or the sun may go behind clouds for a duration of time. This can have the effect of greatly changing the camera's exposure settings, adding out of focus frames to the time-lapse video, and/or including images with greatly varying average luminance levels between frames. The changes in the camera's exposure settings over time may be exacerbated when the captured images are compressed into a time-lapse video format, thus resulting in unwanted flickering in the brightness of the images frames in the resultant assembled time-lapse video clip. Herein are described adaptive image processing techniques for post-processing time-lapse videos from images that are acquired by an apparatus, such as electronic image capture device 500 depicted in FIG. 5.

An embodiment of an operation 100 for post-processing a time-lapse sequence of images is illustrated in FIG. 1. Referring to FIG. 1, operation 100 begins when a user has selected to record a video using a time-lapse mode, and the image capture device, for example a camera or mobile phone, obtains a time-lapse sequence of images at a first frame rate (step 105). An image capture device may, e.g., capture images in an RGB format, wherein an image pixel can encode individual red, green, and/or blue components. RGB pixel values may also be converted to the $YC_BC_R$ color space, wherein pixel luminance and chrominance values are encoded. As is to be understood, other pixel data formats are also possible.

Next, the process may determine a visual metric value for each frame in the input time-lapse sequence of frames (Step 110). In one example, the visual metric values may comprise average values of luminance (Y) (also referred to herein as "$Y_{avg}$" or "average luminance"), e.g., luminance values ranging from 0 to 255 in instances where an 8-bit pixel depth is used for the luminance channel. In such examples, the average luminance value for each frame in the time-lapse sequence may serve as the frame's visual metric value, as shown by the six points plotted in FIG. 2A, corresponding to the visual metric values (in this example, average luminance or, $Y_{avg}$, values) of six consecutive frame in a time-lapse video sequence. In other embodiments, the visual metric value may comprise a brightness value, focus score, exposure score, median luminance, center-weighted, luminance, or other desired visual metric.

Next, at Step 115, the operation may adjust the visual metric value of one or more of the captured frames, e.g., to smooth out large variations in the visual metric value of the captured frames over time. In one example, the process may first apply a curve fitting operation to the determined visual metric values of the captured frames, e.g., by using a regression analysis. In one example, the curve that is fit to the captured images' visual metric values may attempt to minimize the sum of the differences (or sum of the squares of the differences) between each of the visual metric values and the corresponding position on the determined curve of best fit. In some embodiments, the curve may be linear. In other embodiments, the curve that is fit to the captured images' visual metric values may be a $k_{th}$ degree polynomial, such as a second or third degree polynomial. Use of a second or third degree polynomial (i.e., k=2 or 3) for the curve fitting function may help to reduce (or eliminate) unwanted jitter or jumps between the $Y_{avg}$ values of captured frames in the time-lapse video sequence over time. (Recall that, consecutive images used in a time-lapse video may have been captured minutes—or even hours—apart from each other, thus resulting in potentially widely varying lighting conditions between consecutive images in the resultant assembled time-lapse video clip.)

Figure 2A:
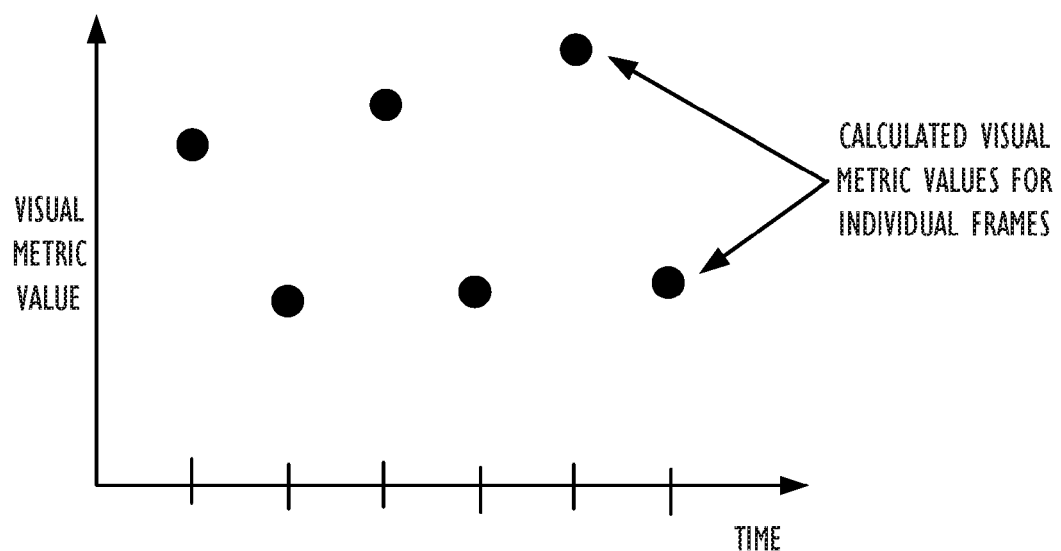
FIG. 2A illustrates average luminance values for each frame for an exemplary time sequence of captured frames.
Figure 2B:
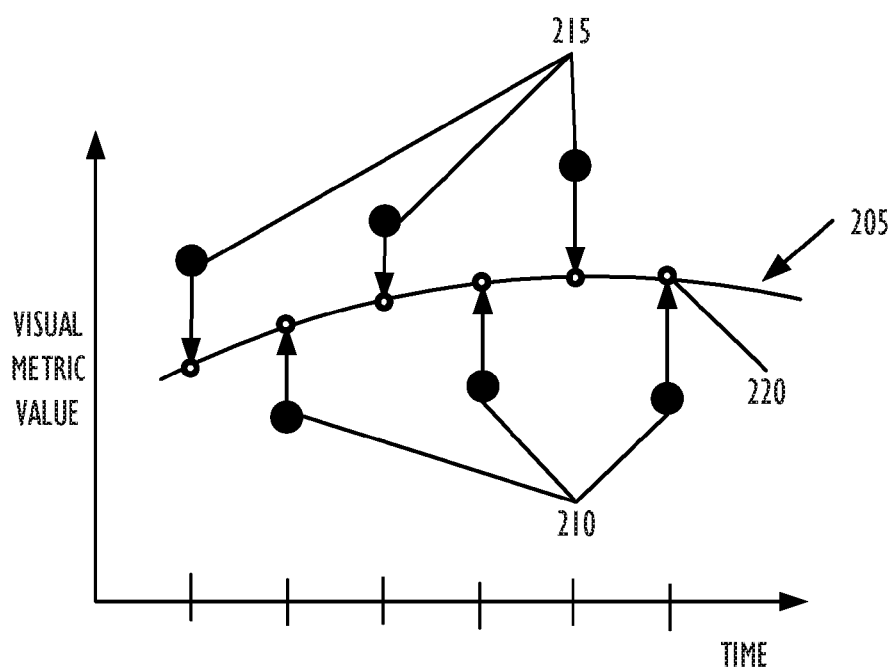
FIG. 2B illustrates adjusted average luminance values for the exemplary time sequence of captured frames.

As shown in FIG. 2B, the curve 205 represents the determined curve of best fit for the six exemplary visual metric values plotted as black dots on the graph of FIG. 2A. In some embodiments, the aforementioned "adjustments" to the visual metric values (in this case, $Y_{avg}$ values) may comprise moving one or more of the images' respective visual metric values to the determined curve 205 of best fit. For example, each data point for the various frames' $Y_{avg}$ values may be moved, e.g., either upwards (as in the case of data points 210) or downwards (as in the case of data points 215) to the curve of best fit 205 by changing the $Y_{avg}$ values to be equal to the adjusted $Y_{avg}$ values determined by curve 205, thereby resulting in a set of adjusted visual metric values for the various frames in the time-lapse video sequence illustrated by the white dots 220 along the curve of best fit 205. As may be appreciated, there may be less fluctuation in average luminance value between the six white dots 220 than there is between the six black dots, indicating less drastic shifts in average frame luminance from frame to frame during the playback of the time-lapse video.

In some embodiments, adjusting the visual metric values for one or more frames at Step 115 may further comprise temporally averaging the adjusted visual metric values for each frame over a number, N, of adjacent frames (wherein the N frames may also include the current frame that is being further adjusted), e.g., in order to further smooth the transitions between the adjusted visual metric values of adjacent frames. In one example, further adjusting the adjusted visual metric values (i.e., the visual metric values that have already been shifted to the curve of best fit, as described above) may include determining a weighted average of the adjusted visual metric values of the N frames. In one embodiment, a weighted average of two or more adjusted visual metric values may be used to further adjust the visual metric value of a current frame (i.e., via a temporal averaging of frames' adjusted visual metric values). For example, in the case where N=3, the adjacent frames may include the frame immediately preceding the current frame (wherein the "current frame" refers to the frame whose visual metric value is being further adjusted via temporal averaging), the current frame, and the frame immediately following the current frame. Assuming the current frame has a capture time of t, then the three visual metric values used in the above scenarios would be: $Y_{avg}(t-1)$ (i.e., the adjusted average luminance value of the frame immediately preceding the current frame), $Y_{avg}(t)$ (i.e., the adjusted average luminance value of the current frame), and $Y_{avg}(t+1)$ (i.e., the adjusted average luminance value of the frame immediately following the current frame). In other embodiments, the frames used in the temporal averaging operation need not be immediately adjacent to the current frame. For example, if the current frame is frame t=10, its further adjusted visual metric value may be a weighted average of the visual metric values of frames t=4, 6, 8, 10, 12, 14, and 16. Other temporal weighting schemes are also possible, depending on the needs of a given implementation.

In the determination of the temporally weighted average of the current frames, the adjusted visual metric values of the adjacent frames may be individually weighted. In the case where N=3, e.g., the weights used may be represented by variables: w1, w2, and w3; and the weighted contributions of each adjacent frame may be averaged to determine the final adjusted visual metric value of the current frame. In one embodiment, an algebraic weighted sum may be used to determine the final adjusted visual metric value (referred to in the formula below as, $Y_2(t)$) of the current frame, according to the formula: $Y_2(t)=[w1*Y_{avg}(t-1)+w2*Y_{avg}(t)+w3*Y_{avg}(t+1)]/(w1+w2+w3)$. In other embodiments, the number of adjacent frames used in the temporal weighting operation can be larger (or smaller) than 3, as is desired for a given implementation. In some embodiments, the weights (e.g., w1, w2, and w3) may each be equal to each other. In still other embodiments, the weights (e.g., w1, w2, and w3) may be constrained such that their sum is always equal to some constant value, such as 1.

Next, at Step 120, the process may adjust one or more visual characteristics (e.g., luminance, brightness, focus, color composition, tint, etc.) of the one or more captured frames based, at least in part, on their respective adjusted visual metric values (e.g., the $Y_{avg}$ values that were adjusted to meet the curve of best fit 205 and/or temporally averaged over some number of adjacent frames). In some embodiments, adjusting the one or more visual characteristics of the one or more captured frames based on their respective adjusted visual metric values may comprise adjusting a luminance histogram of the respective image, e.g., such that, after adjustment, the image's average luminance will equal the adjusted visual metric value determined for the frame in Step 115. In some embodiments, adjusting an image's luminance histogram may comprise shifting the histogram such that the average luminance of the image after the shifting operation equals the adjusted visual metric value determined for the frame in Step 115. In other embodiments, adjusting an image's luminance histogram may further comprise shifting the histogram by a specified amount and then spreading the histogram, e.g., so as to increase (and, in some cases, maximize) the image frame's dynamic range, in a process known as "gain normalizing," as will be explained in further detail below.

Once the desired visual characteristics of the one or more frames in the sequence have been adjusted based, at least in part, on their respective adjusted visual metric values, the image data may be reformatted back to a different color format if so desired, e.g., from the $YC_BC_R$ color space back into an RGB color space. Finally, the adjusted image data may be used to assemble an output time-lapse video comprised of the adjusted frames (Step 125).

Figure 3:
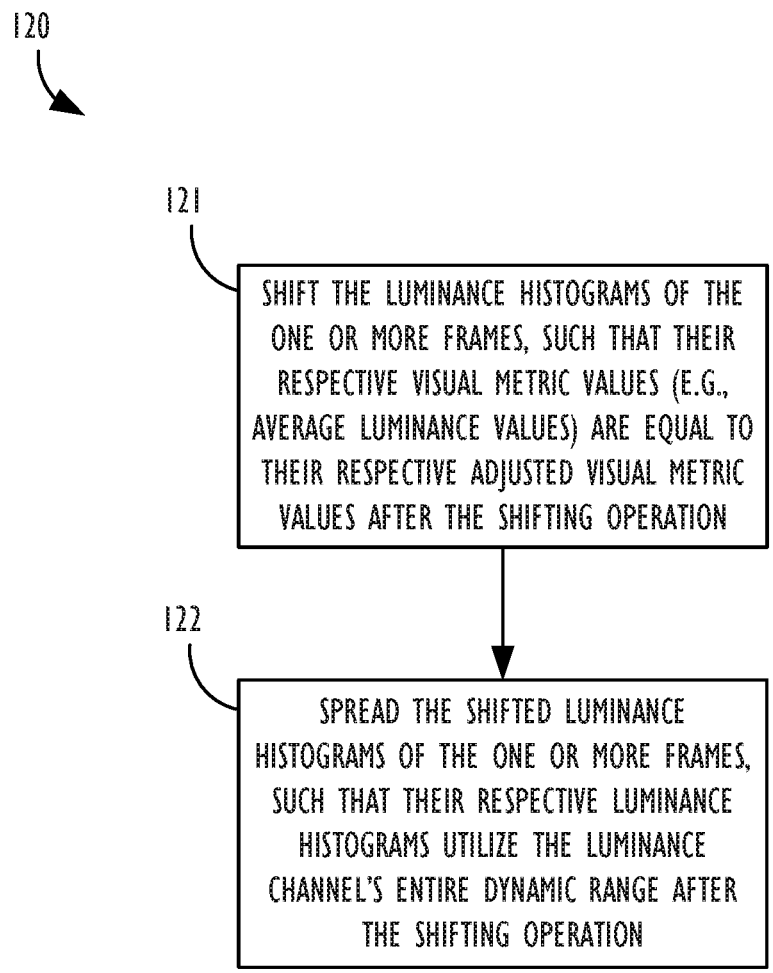
FIG. 3 is a flowchart illustrating additional details of another embodiment of the adaptive image processing techniques described herein.

FIG. 3 illustrates additional details for one potential embodiment for performing Step 120 of operation 100. For the exemplary embodiment of FIG. 3, it may be assumed that the visual metric values determined in Step 110 of operation 100 comprise average luminance values, and that the luminance values for the pixels making up each image frame may be represented in histogram form. The image luminance histograms, then, represent one example of a visual characteristic of the image frame that may be adjusted based, at least in part, on the frame's respective adjusted visual metric value.

First, at Step 121, the process may begin by shifting the luminance histograms of the one or more frames, such that their respective visual metric values (e.g., average luminance values) are equal to theft respective adjusted visual metric values (i.e., as determined at Step 115) after the shifting operation is completed. The process of shifting an image's luminance histogram is illustrated in greater detail and described below with reference to FIG. 4B.

Next, at Step 122, the process may spread the shifted luminance histograms of the one or more frames, such that their respective luminance histograms utilize a greater extent of the luminance channel's dynamic range (e.g., the channel's entire dynamic range) after the shifting operation. In the case of images using an 8-bit pixel depth for the luminance channel, this may mean spreading the luminance values of a respective image over the range of 0 to 255 (i.e., $2^8-1$). The process of spreading an image's luminance histogram is illustrated in greater detail and described below with reference to FIG. 4C.

Figure 4A:
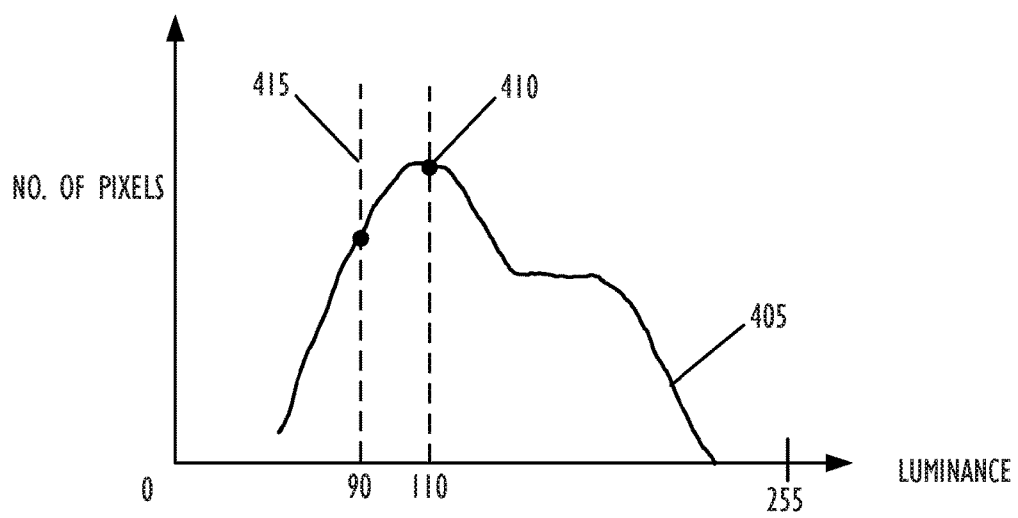
FIG. 4A illustrates an exemplary luminance histogram for a captured image frame.
Figure 4B:
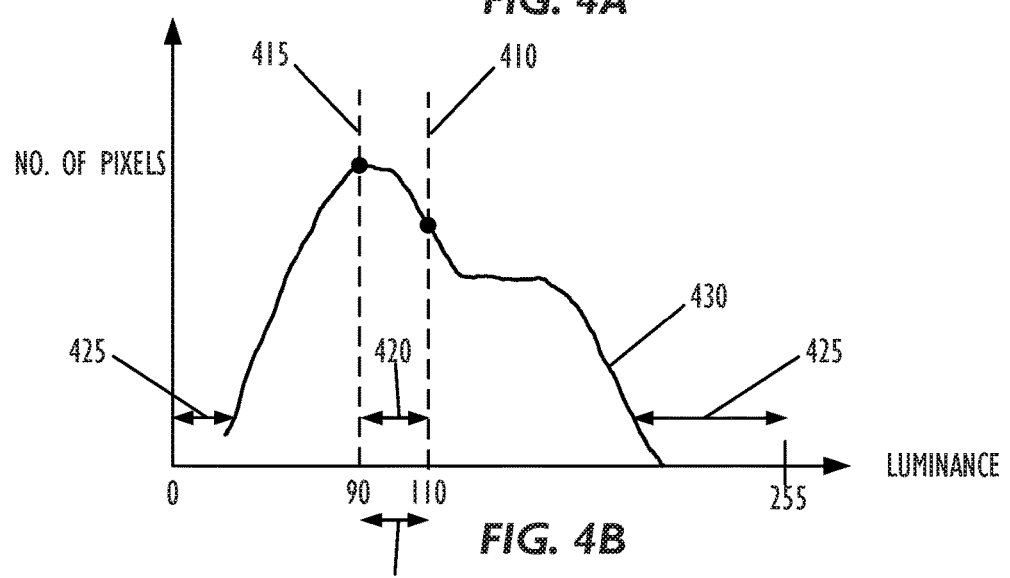
FIG. 4B illustrates an exemplary shifted luminance histogram for a captured image frame.
Figure 4C:
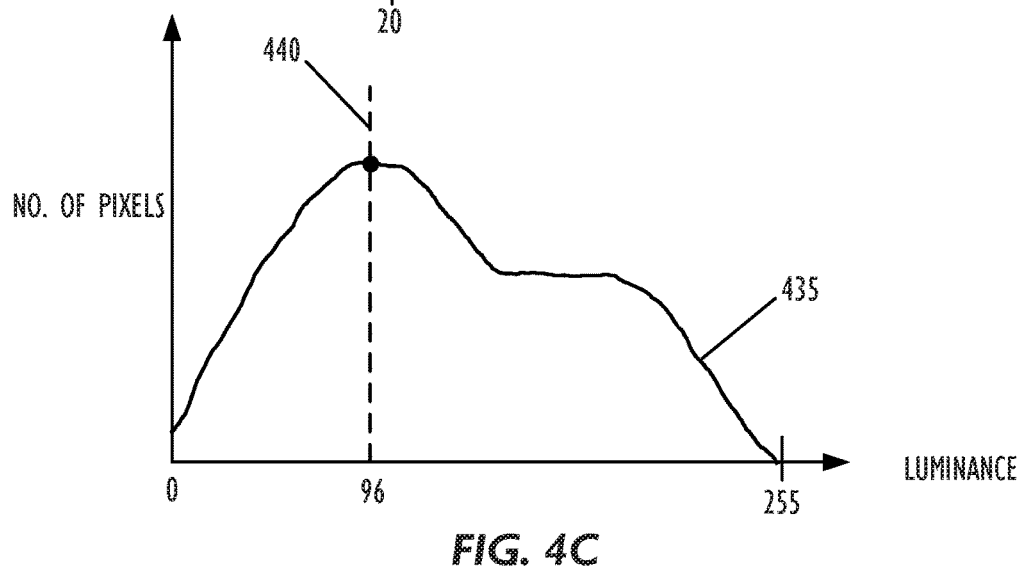
FIG. 4C illustrates an exemplary shifted and spread luminance histogram for a captured image frame.

In one example, FIG. 4A illustrates an exemplary luminance histogram 405 for a captured image frame; FIG. 4B illustrates an exemplary shifted luminance histogram 430 for the captured image frame; and FIG. 4C illustrates an exemplary shifted and spread luminance histogram 435 for the captured image frame.

As shown in FIG. 4A, the calculated average luminance 410 (i.e., the determined visual metric value from Step 110) for the captured image frame is 110 (out of the possible range of luminance values of 0 to 255, in this example). For the sake of this example, it will be assumed that the adjusted average luminance value 415 (i.e., the adjusted visual metric value from Step 115) for the captured image frame is 90. As discussed above, the determined adjusted visual metric value may be the result of moving the frame's average luminance value from its original value to the corresponding value of determined curve of best fit 205, and/or temporally averaging the frame's determined adjusted visual metric value with the adjusted visual metric values of one or more adjacent (or otherwise nearby) frames in the time-lapse video sequence.

In this example, the difference 420, shown in FIG. 4B, between the frame's original average luminance value and the adjusted average luminance (e.g., determined in Step 115) is 20 (i.e., 110-90). According to some embodiments, based on the difference, the image's original luminance histogram 405 may be shifted by the determined difference to create shifted image histogram 430, where the average luminance of the frame has been made equal to the adjusted average luminance value 415 (Step 121). Shifting the luminance histogram may create an unused portion of the image's dynamic range, as depicted by region 425 in FIG. 4B.

To avoid this unused portion of the image's dynamic range of luminance values, the shifted luminance histogram 430 may further be scaled or spread over the unused portion of the image's dynamic 425 using one or more known histogram data spreading operations, thus spreading out the intensity values of histogram 430 over the entire dynamic range of luminance values (even if this extends the dynamic range of frame's pixel data beyond its original dynamic range). Spreading or extending the exemplary intensity values of the image depicted in FIG. 4B may result in histogram 435 with a luminance value distribution as shown in FIG. 4C (Step 122). As a result of the spreading operation, the average luminance value 440 of histogram 435 may be shifted from its position 415 in unspread histogram 430 (e.g., from the value of 90 in FIG. 4B to the value of 96, as shown in the example of FIG. 4C).

This process of scaling each frame's luminance values to utilize the entire dynamic range of the luminance channel may also be referred to herein as "gain normalizing." By scaling the luminance values of the pixels of each frame in the time-lapse video sequence to utilize the entire dynamic range of the luminance channel, the contrast of the image may be improved. In other words, the image may maintain the same approximate brightness levels, but it becomes less compressed.

Figure 5:
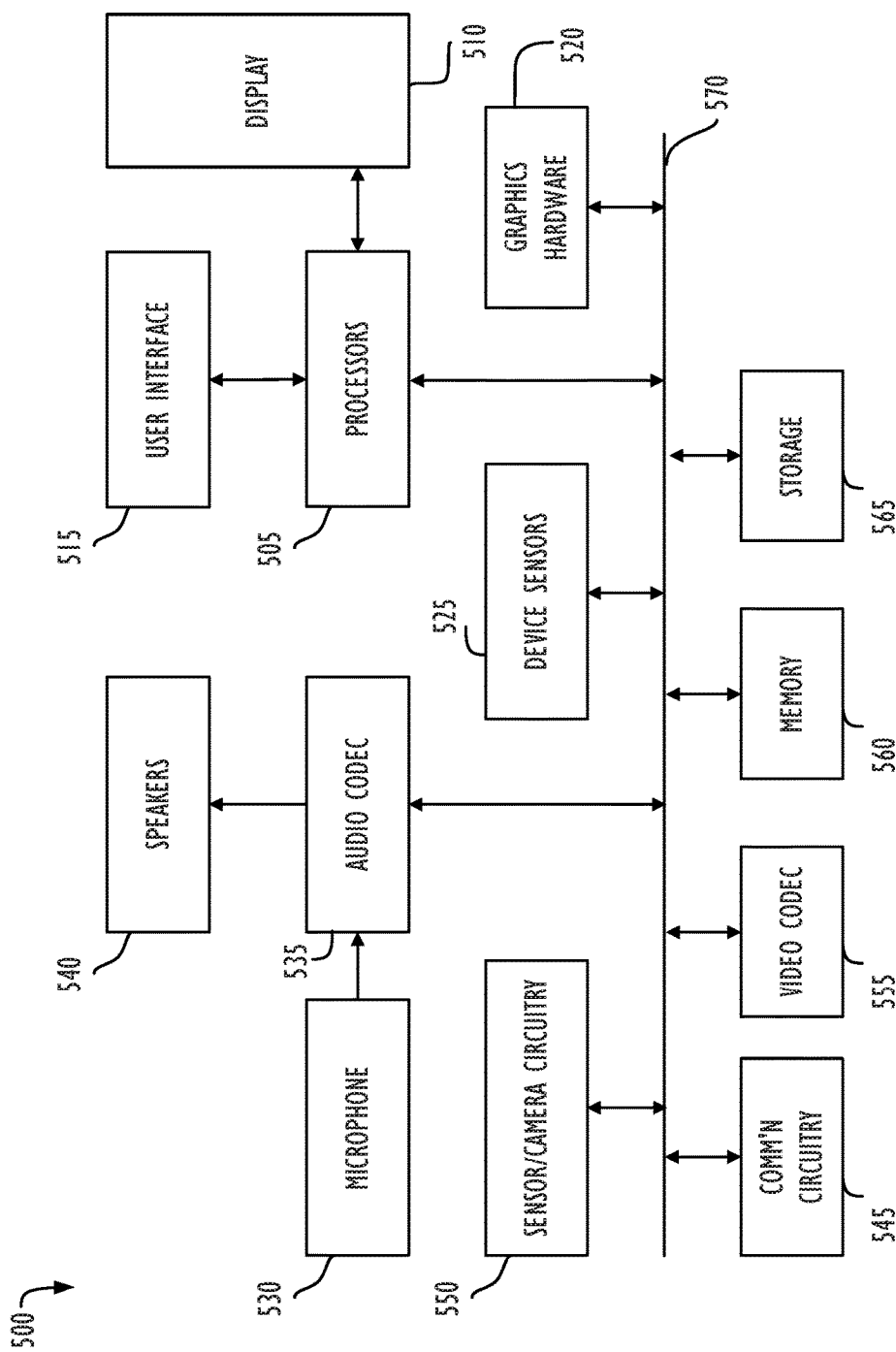
FIG. 5 illustrates an programmable electronic image capture device, in accordance with one or more embodiments.

FIG. 5 is a simplified functional block diagram of an illustrative programmable electronic image capture device 500, according to one or more embodiments described herein. Electronic device 500 may include processor 505, display 510, user interface 515, graphics hardware 520, device sensors 525 (e.g., proximity sensor/ambient light sensor, accelerometer and/or gyroscope), microphone 530, audio codec(s) 535, speaker(s) 540, communications circuitry 545, digital image capture unit 550, video codec(s) 555, memory 560, storage 565, and communications bus 570. Electronic device 500 may be, for example, a personal digital assistant (PDA), personal music player, a mobile telephone, or a notebook, laptop or tablet computer system.

Processor 505 may execute instructions necessary to carry out or control the operation of many functions performed by device 500 (e.g., such as the generation and/or processing of improved time-lapse video in accordance with operation 100). Processor 505 may, for instance, drive display 510 and receive user input from user interface 515. User interface 515 can take a variety of forms, such as a button, keypad, dial, a click wheel, keyboard, display screen and/or a touch screen. Processor 505 may be a system-on-chip such as those found in mobile devices and include a dedicated graphics processing unit (GPU). Processor 505 may represent multiple central processing units (CPUs) and may be based on reduced instruction set computer (RISC) or complex instruction set computer (CISC) architectures or any other suitable architecture and each may include one or more processing cores. Graphics hardware 520 may be special purpose computational hardware for processing graphics and/or assisting processor 505 process graphics information. In one embodiment, graphics hardware 520 may include one or more programmable graphics processing unit (GPU), where each such unit has multiple cores.

Sensor and camera circuitry 550 may capture still and video images that may be processed to generate images and videos, e.g., time-lapse videos, in accordance with this disclosure. Sensor and camera circuitry 550 may capture raw image data as RGB data that is processed to generate image data in the $YC_BC_R$ color space. Output from camera circuitry 550 may be processed, at least in part, by video codec(s) 555 and/or processor 505 and/or graphics hardware 520, and/or a dedicated image processing unit incorporated within circuitry 550. Images so captured may be stored in memory 560 and/or storage 565. Memory 560 may include one or more different types of media used by processor 505, graphics hardware 520, and image capture circuitry 550 to perform device functions. For example, memory 560 may include memory cache, read-only memory (ROM), and/or random access memory (RAM). Storage 565 may store media (e.g., audio, image and video files), computer program instructions or software, preference information, device profile information, and any other suitable data. Storage 565 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 560 and storage 565 may be used to retain computer program instructions or code organized into one or more modules and written in any desired computer programming language. When executed by, for example, processor 505, such computer program code may implement one or more of the image processing techniques described herein.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). In addition, it will be understood that some of the operations identified herein may be performed in different orders. The scope of the invention therefore should be determined with reference to the appended claims, along with the full scope of equivalents to which such claims are entitled.

The invention claimed is:

1. A non-transitory program storage device, readable by a programmable control device, comprising instructions stored thereon that, when executed, cause the programmable control device to:
    obtain an input time-lapse sequence of frames;
    determine a visual metric value for each frame of the input time-lapse sequence of frames;
    determine a first curve to fit the visual metric values for the input time-lapse sequence of frames;
    determine an adjusted visual metric value for one or more of the frames of the input time-lapse sequence of frames, wherein the determined adjusted visual metric value for each frame is equal to a corresponding value from the determined first curve, and wherein the one or more adjusted visual metric values comprise first adjusted visual metric values;
    adjust a visual characteristic of the one or more of the frames of the input time-lapse sequence of frames, such that, after the adjustment of the visual characteristic of each of the one or more frames, the visual metric value of each of the one or more frames is moved towards its respective first adjusted visual metric value; and
    generate an output time-lapse sequence of frames comprising the one or more frames having the adjusted visual characteristic.

2. The non-transitory program storage device of claim 1, wherein the instructions that, when executed, cause the programmable control device to obtain the input time-lapse sequence of frames comprise instructions that, when executed, cause the programmable control device to:
    obtain a first input time-lapse sequence of frames in a first format; and
    convert the first input time-lapse sequence of frames into a second format to generate the input time-lapse sequence of frames.

3. The non-transitory program storage device of claim 2, wherein:
    the first format comprises an RGB format; and
    the second format comprises aft $YC_BC_R$ format.

4. The non-transitory program storage device of claim 1, wherein the instructions that, when executed, cause the programmable control device to determine the visual metric value for each frame comprise instructions that, when executed, cause the programmable control device to determine an average luminance value for each frame of the input time-lapse sequence of frames.

5. The non-transitory program storage device of claim 1, wherein the instructions that, when executed, cause the programmable control device to adjust a visual characteristic of the one or more of the frames of the input time-lapse sequence of frames further comprise instructions that, when executed, cause the programmable control device to:
    adjust a visual characteristic of the one or more of the frames of the input time-lapse sequence of frames, such that, after the adjustment of the visual characteristic of each of the one or more frames, the visual metric value of each of the one or more frames is equal to its respective first adjusted visual metric value.

6. The non-transitory program storage device of claim 1, wherein the instructions that, when executed, cause the programmable control device to adjust the visual metric value for one or more of the frames of the input time-lapse sequence of frames further comprise instructions that, when executed, cause the programmable control device to:
    further adjust the first adjusted visual metric value of at least one of the one or more frames to be equal to a weighted average of the first adjusted visual metric values of one or more adjacent frames in the input time-lapse sequence of frames.

7. The non-transitory program storage device of claim 1, wherein each frame of the input time-lapse sequence of frames comprises an image histogram, and
    wherein the instructions that, when executed, cause the programmable control device to adjust a visual characteristic of the one or more of the frames of the input time-lapse sequence of frames further comprise instructions that, when executed, cause the programmable control device to shift the image histograms of the one or more frames based on the first adjusted visual metric value of the respective frame.

8. The non-transitory program storage device of claim 7, wherein the instructions that, when executed, cause the programmable control device to adjust a visual characteristic of the one or more of the frames of the input time-lapse sequence of frames further comprise instructions that, when executed, cause the programmable control device to spread the image histograms of the one or more frames.

9. A computer-implemented method for generating a time-lapse sequence of frames, comprising:
    obtaining an input time-lapse sequence of frames;
    determining a visual metric value for each frame of the input time-lapse sequence of frames;
    determining a first curve to fit the visual metric values for the input time-lapse sequence of frames;
    determining an adjusted visual metric value for one or more of the frames of the input time-lapse sequence of frames, wherein the determined adjusted visual metric value for each frame is equal to a corresponding value from the determined first curve, and wherein the one or more adjusted visual metric values comprise first adjusted visual metric values;
    adjusting a visual characteristic of the one or more of the frames of the input time-lapse sequence of frames, such that, after the adjustment of the visual characteristic of each of the one or more frames, the visual metric value of each of the one or more frames is moved towards its respective first adjusted visual metric value; and
    generating an output time-lapse sequence of frames comprising the one or more frames having the adjusted visual characteristic.

10. The computer-implemented method of claim 9, wherein obtaining the input time-lapse sequence of frames comprises:
    obtaining a first input time-lapse sequence of frames in a first format; and
    converting the first input time-lapse sequence of frames into a second format to generate the input time-lapse sequence of frame.

11. The computer-implemented method of claim 10, wherein:
the first format comprises an RGB format; and
the second format comprises aft $YC_BC_R$ format.

12. The computer-implemented method of claim 9, wherein determining a visual metric value comprises determining an average luminance value of each frame in the input time-lapse sequence of frames.

13. The computer-implemented method of claim 9, wherein adjusting a visual characteristic of the one or more of the frames of the input time-lapse sequence of frames further comprises:
adjusting a visual characteristic of the one or more of the frames of the input time-lapse sequence of frames, such that, after the adjustment of the visual characteristic of each of the one or more frames, the visual metric value of each of the one or more frames is equal to its respective first adjusted visual metric value.

14. The computer-implemented method of claim 9, wherein adjusting the visual metric value for one or more of the frames of the input time-lapse sequence of frames further comprises:
further adjusting the first adjusted visual metric value of at least one of the one or more frames to be equal to a weighted average of the first adjusted visual metric values of one or more adjacent frames in the input time-lapse sequence of frames.

15. The computer-implemented method of claim 9, wherein each frame of the input time-lapse sequence of frames comprises an image histogram, and
wherein adjusting a visual characteristic of the one or more of the frames of the input time-lapse sequence of frames further comprises shifting the image histograms of the one or more frames based on the first adjusted visual metric value of the respective frame.

16. The computer-implemented method of claim 15, wherein adjusting a visual characteristic of the one or more of the frames of the input time-lapse sequence of frames further comprises spreading the image histograms of the one or more frames.

17. An electronic device comprising:
an image sensor,
a memory operatively coupled to the image sensor, and
one or more processors operatively coupled to the memory and the image sensor, wherein the one or more processors are programmed to execute instructions that cause the one or more processors to:
obtain an input time-lapse sequence of frames;
determine a visual metric value for each frame of the input time-lapse sequence of frames;
determine a first curve to fit the visual metric values for the input time-lapse sequence of frames;
determine an adjusted visual metric value for one or more of the frames of the input time-lapse sequence of frames, wherein the determined adjusted visual metric value for each frame is equal to a corresponding value from the determined first curve, and wherein the one or more adjusted visual metric values comprise first adjusted visual metric values;
adjust a visual characteristic of the one or more of the frames of the input time-lapse sequence of frames, such that, after the adjustment of the visual characteristic of each of the one or more frames, the visual metric value of each of the one or more frames is moved towards its respective first adjusted visual metric value of the one or more frames; and
generate an output time-lapse sequence of frames comprising the one or more frames having the adjusted visual characteristic.

18. The electronic device of claim 17, wherein the one or more processors are further programed to execute instructions that cause the one or more processors to:
obtain a first input time-lapse sequence of frames in a first format; and
convert the first input time-lapse sequence of frames into a second format to generate the input time-lapse sequence of frame.

19. The electronic device of claim 18, wherein:
the first format comprises an RGB format; and
the second format comprises aft $YC_BC_R$ format.

20. The electronic device of claim 17, wherein the one or more processors are programed to execute instructions that cause the one or more processors to determine an average luminance value for each frame in the input time-lapse sequence of frames.

21. The electronic device of claim 17, wherein the instructions that cause the one or more processors to adjust a visual characteristic of the one or more of the frames of the input time-lapse sequence of frames further comprise instructions that cause the one or more processors to:
adjust a visual characteristic of the one or more of the frames of the input time-lapse sequence of frames, such that, after the adjustment of the visual characteristic of each of the one or more frames, the visual metric value of each of the one or more frames is equal to its respective first adjusted visual metric value.

22. The electronic device of claim 21, wherein the instructions that cause the one or more processors to adjust the visual metric value for one or more of the frames of the input time-lapse sequence of frames based, at least in part, on the determined first curve further comprise instructions that cause the one or more processors to:
further adjust the first adjusted visual metric value of at least one of the one or more frames to be equal to a weighted average of the first adjusted visual metric values of one or more adjacent frames in the input time-lapse sequence of frames.

23. The electronic device of claim 17, wherein each frame of the input time-lapse sequence of frames comprises an image histogram, and
wherein the instructions that cause the one or more processors to adjust a visual characteristic of the one or more of the frames of the input time-lapse sequence of frames further comprise instructions to shift the image histograms of the one or more frames based on the first adjusted visual metric value of the respective frame.

24. The electronic device of claim 23, wherein the instructions that cause the one or more processors to adjust a visual characteristic of the one or more of the frames of the input time-lapse sequence of frames further comprise instructions that cause the one or more processors to spread the image histograms of the one or more frames.

\* \* \* \* \*

UNITED STATES PATENT AND TRADEMARK OFFICE
CERTIFICATE OF CORRECTION

PATENT NO. : 10,133,934 B2
APPLICATION NO. : 15/273644
DATED : November 20, 2018
INVENTOR(S) : Earl Q. Wong et al.

Page 1 of 1

It is certified that error appears in the above-identified patent and that said Letters Patent is hereby corrected as shown below:

In the Claims

Claim 3 at Column 9, Line 54 should read:
-- the second format comprises a $YC_BC_R$ format. --

Claim 11 at Column 11, Line 4 should read:
-- the second format comprises a $YC_BC_R$ format. --

Claim 19 at Column 12, Line 18 should read:
-- the second format comprises a $YC_BC_R$ format. --

Signed and Sealed this
Twenty-fifth Day of December, 2018

Andrei Iancu
*Director of the United States Patent and Trademark Office*